(12) United States Patent
Szufarska et al.

(10) Patent No.: US 8,903,384 B2
(45) Date of Patent: Dec. 2, 2014

(54) METHOD AND APPARATUS FOR DETERMINING A TIME INTERVAL AT AN ACCESS NODE FOR RADIO MEASUREMENTS

(75) Inventors: Agnieszka Szufarska, Gdansk (PL); Juergen Michel, Munich (DE); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 208 days.

(21) Appl. No.: 13/500,090

(22) PCT Filed: Oct. 9, 2009

(86) PCT No.: PCT/EP2009/063224

§ 371 (c)(1),
(2), (4) Date: Apr. 4, 2012

(87) PCT Pub. No.: WO2011/042067

PCT Pub. Date: Apr. 14, 2011

(65) Prior Publication Data

US 2012/0202490 A1     Aug. 9, 2012

(51) Int. Cl.
*H04W 4/00*          (2009.01)
*H04W 24/10*         (2009.01)
*H04W 84/04*         (2009.01)

(52) U.S. Cl.
CPC ............ *H04W 24/10* (2013.01); *H04W 84/045* (2013.01)
USPC ...................................... 455/434; 455/435.1

(58) Field of Classification Search
CPC ...... H04W 48/16; H04W 60/00; H04W 36/30
USPC ............................ 455/434, 435.1, 436, 456.1
See application file for complete search history.

(56) References Cited

U.S. PATENT DOCUMENTS

2005/0124335 A1    6/2005   Cave et al. ................. 455/422.1
2006/0019672 A1*   1/2006   Kolding et al. ............ 455/452.2
2006/0223557 A1   10/2006   Manohar ....................... 455/502
2009/0325582 A1*  12/2009   Jagadeesan et al. .......... 455/436

OTHER PUBLICATIONS

R4-091976, TSG-RAN working Group 4 (Radio) Meeting #51, San Francisco, May 4-8, 2009, "LTE-FDD HeNB Interference Scenarios", Vodafone et al., 4 pgs.
R4-093196, 3GPP TSG RAN WG4 Meeting #52, Shenzhen, China, Aug. 24-28, 2009, "Interference Mitigation for HeNBs by Channel Measurements", Institute for Information Industry (III), Coiler Corp., 6 pgs.

* cited by examiner

*Primary Examiner* — Phuoc H Doan
(74) *Attorney, Agent, or Firm* — Harrington & Smith (57) ABSTRACT

A method includes determining at least one time interval for an access node of a group of neighboring access nodes. The at least one time interval is one in which said access node has substantially no transmission and one or more other access nodes of said group transmit. The method further includes performing, by said access node, radio measurements in said at least one determined time interval of said one or more other access nodes of said group which transmit and configuring radio resources in dependence on said radio measurements.

23 Claims, 5 Drawing Sheets

METHOD AND APPARATUS FOR DETERMINING A TIME INTERVAL AT AN ACCESS NODE FOR RADIO MEASUREMENTS

FIELD OF THE INVENTION

The present invention relates to a method and apparatus which may be used for a group of access nodes.

BACKGROUND

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system at least a part of the communication between at least two stations occurs over a wireless link. Examples of wireless systems include public land mobile networks (PLMN), satellite based communication systems and different wireless local networks, for example wireless local area networks (WLAN). The wireless systems can be divided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems, a communication device provides a transceiver station that can communicate with e.g. a base station of an access network servicing at least one cell and/or another communications device. Depending on the context, a communication device or user equipment may also be considered as being a part of a communication system. In certain applications, for example in ad-hoc networks, the communication system can be based on use of a plurality of user equipment capable of communicating with each other.

The communication may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. The user may also be provided broadcast or multicast content. Non-limiting examples of the content include downloads, television and radio programs, videos, advertisements, various alerts and other information.

$3^{rd}$ Generation Partnership Project (3GPP) is standardizing an architecture that is known as the long-term evolution (LTE) of the Universal Mobile Telecommunications System (UMTS) radio-access technology. A further development of the LTE is referred to herein as LTE-Advanced.

In the LTE system, one of the base station classes is defined to comprise the so-called femto nodes. These femto nodes may also be referred to as home eNodeBs (HeNBs). These femto nodes are typically deployed in indoor environments, preferably in plug-and-play or self-organized network (SON) fashion and with access limitations so that only a configured group of subscribers is allowed to access a femto node. For example in residential deployment of a femto node typically family members are part of a configured subscriber group and other subscribers can not access the femto node.

In SON-based deployment of femto nodes, difficulties can arise if two neighbouring nodes, having been activated with a potentially configured subscriber group, end up with the same particular cell configuration. That can cause severe interference, and/or identity or resource conflicted scenarios between those nodes so that access and communication is not possible for subscribers in the vicinity of the nodes.

SUMMARY

According to one embodiment there is provided a method comprising: determining at least one time interval for an access node of a group of neighboring access nodes, said at least one time interval being one in which said access node has substantially no transmission and one or more other access nodes of said group transmit; performing, by said access node, radio measurements in said at least one determined time interval of said one or more other access nodes of said group which transmit; and configuring radio resources in dependence on said radio measurements.

According to one embodiment there is provided a method comprising: receiving transmissions in a user equipment from a plurality of neighboring access nodes, determining that a plurality of neighboring access nodes are measuring interference in a substantially overlapping time interval; and sending information about said determined substantially overlapping time interval to at least one of said plurality of neighboring access nodes.

According to one embodiment there is provided an apparatus comprising: means for determining at least one time interval for an access node of a group of neighboring access nodes, said at least one time interval being one in which said access node has no transmission and one or more other access nodes of said group transmit; means for causing radio measurements to be performed in said at least one determined time interval of said one or more other access nodes of said group which transmit According to one embodiment there is provided apparatus comprising: means for analyzing transmissions from a plurality of neighboring access nodes to determining that a plurality of neighboring access nodes are measuring interference in a substantially overlapping time interval; and means for causing information to be sent information about said determined substantially overlapping time interval to at least one of said plurality of neighboring access nodes.

According to one embodiment there is provided apparatus comprising at least one processor and at least one memory comprising computer code, the at least one memory and computer code configured to, with the at least one processor, cause the apparatus to: determine at least one time interval for an access node of a group of neighboring access nodes, said at least one time interval being one in which said access node has substantially no transmission and one or more other access nodes of said group transmit; cause radio measurements to be performed in said at least one determined time interval of said one or more other access nodes of said group which transmit; and configure radio resources in dependence on said radio measurements.

According to one embodiment there is provided apparatus comprising at least one processor and at least one memory comprising computer code, the at least one memory and computer code configured to, with the at least one processor, cause the apparatus to: analyze received transmissions in a user equipment from a plurality of neighboring access nodes, determine that a plurality of neighboring access nodes are measuring interference in a substantially overlapping time interval; and cause information to be sent about said determined substantially overlapping time interval to at least one of said plurality of neighboring access nodes.

DESCRIPTION OF DRAWINGS

For a better understanding of some embodiments of the invention, reference will be made by way of example only to the accompanying drawings in which.

DETAILED DESCRIPTION OF SOME
EMBODIMENTS OF THE INVENTION

Figures 1, 4:
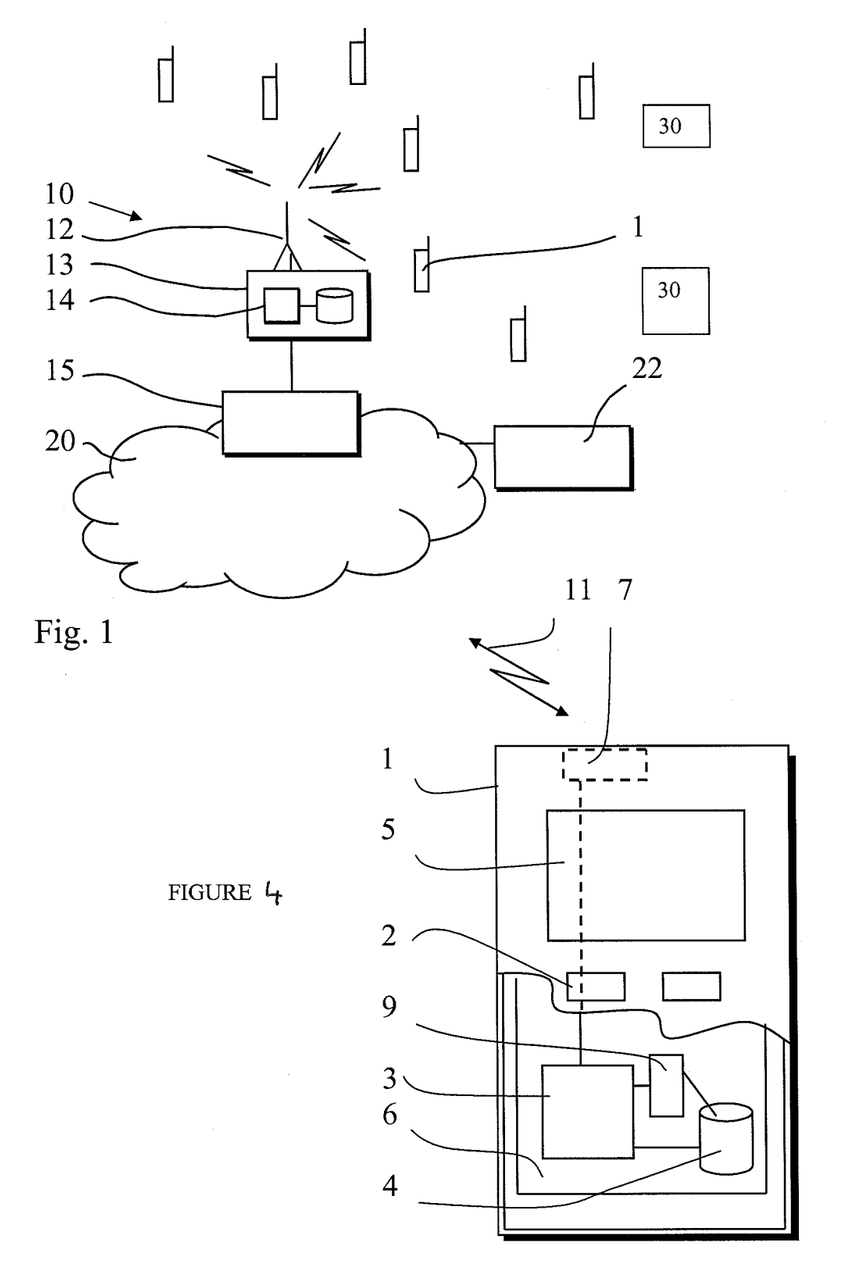
FIG. 1 shows schematically a network in which some embodiments of the present invention may be implemented.
FIG. 4 schematically shows a user equipment embodying the invention.

In the following some embodiments are explained with reference to wireless or mobile communication systems serving mobile communication devices. Reference is now made to FIGS. 1 and 4.

A communication device can be used for accessing various services and/or applications provided via a communication system. In wireless or mobile communication systems the access is provided via an access interface between mobile communication devices 1 and an appropriate wireless access system 10. A mobile device 1 can typically access wirelessly a communication system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

A base station is typically controlled by at least one appropriate controller so as to enable operation thereof and management of mobile communication devices in communication with the base station. The control entity can be interconnected with other control entities. In FIG. 1 the controller is shown to be provided by block 13. The controller is typically provided with memory capacity and at least one data processor 14. It shall be understood that the control functions may be distributed between a plurality of controller units.

In the FIG. 1 example the base station node 12 is connected to a data network 20 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN). Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Also as shown in FIG. 1 is a plurality of nodes 30. The nodes 30 may be femto nodes, also known as home eNodeBs or local area access points. These nodes will be described in more detail hereinafter.

By way of example only, femto nodes have lower transmission power compared to NodeBs or eNBs and cheaper RF components such as oscillators and filters, due to relaxed requirements in standards. For example in LTE HeNB transmission power is about 100 times lower compared to eNB transmission power and frequency stability requirements are in between eNB- and UE requirements. The transmission and reception range for femto nodes may be adapted to residential indoor scenarios; and, for the envisaged data rates of 50 to 100 Mbit/s in the downlink, a coverage range of 10 meters is sufficient.

FIG. 4 shows a schematic, partially sectioned view of a communication device 1 that can be used for communication on a carrier 11 comprising a plurality of component carriers, for example with at least one base station. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like.

Figure 2:
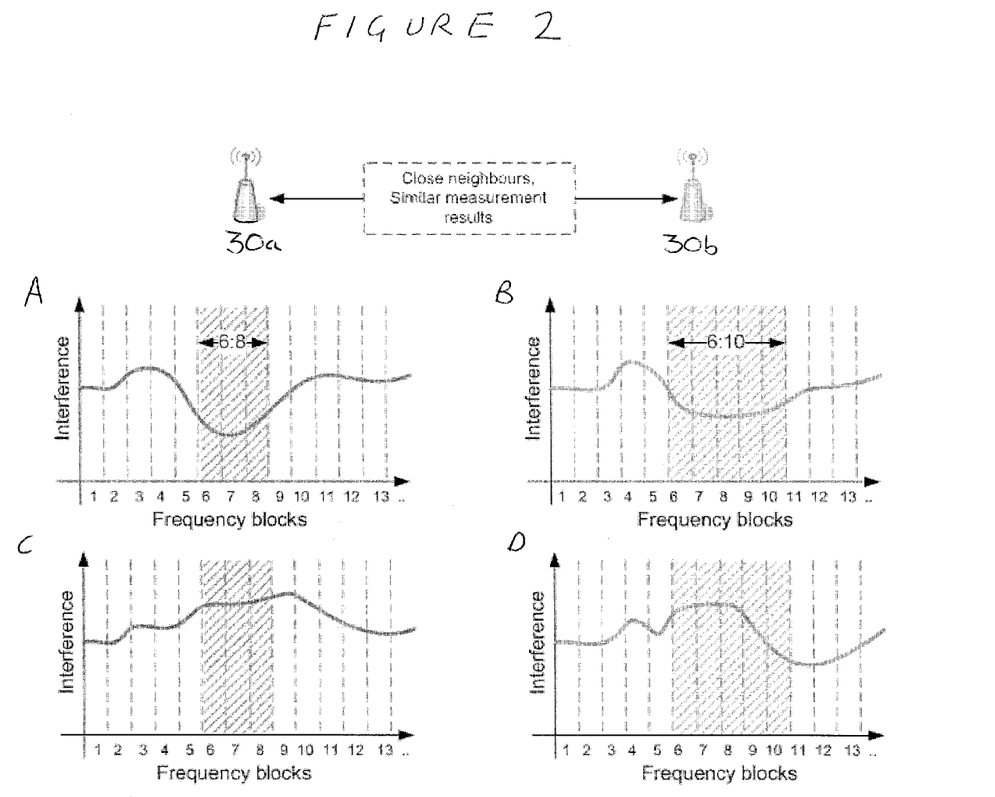
FIG. 2 schematically shows frequency resource configuration on the basis of simultaneous measurement.

A mobile communication device may be used for voice and video calls, for accessing service applications provided via a data network. The mobile device 1 may receive signals via appropriate apparatus for receiving and transmitting radio signals. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Nodes such as access point 30 are relatively low power nodes that may be deployed to provide enhanced indoor coverage, additional capacity at hotspots or cell edge regions. For example, in the case of indoor deployment, such an access point or node may be provided for example in apartment blocks and hence there may be a relatively high density of such access nodes. These nodes may be operated on the same carrier frequency as the over lying macro layer, that is on the same frequency as the associated base station or have a dedicated local frequency band. In some embodiments of the present invention, the nodes 30 may additionally or alternatively operate in an unlicensed band. Unlicensed bands are frequency bands where operators and users do not need any license to utilize the bands and typically have only power or power density restrictions—established by telecommunication regulation bodies—need to be observed. Some unlicensed bands have been initially reserved for industrial, scientific and medical purposes and therefore are often referred to as ISM radio bands. A well known unlicensed band is the 2.4 GHz band used for WLAN access in a multitude of countries.

In some embodiments of the present invention, the access points may provide operation in an unlicensed band, out of the network operator control. The access points may have a plug-and-play mode of operation with control, reduced control or no control from the core network. In some embodiments of the present invention where there is reduced control or no control, the access points therefore will have enhanced self-organising functionality. The access points may be arranged to facilitate operations in a dynamic, SON-based radio environment.

These nodes may be referred to as optimised local area access points. Usually, the deployment of these access nodes is uncoordinated. Further, there may be some difficulty for the network to control the access node parameters (cell-specific or radio-operation configuration parameters in particular.

Reference is made to FIG. 2 which illustrates frequency resource configuration on the basis of simultaneous measurements. FIG. 2 shows a first access point 30*a* and a second access point 30*b*. These access points are neighbouring access points and are close enough to interfere with each other. In particular, in some situations, the dominant interference at these access points 30*a* and 30*b* comes from other access points, such as from each other. Typically, the wide area frequency, that is the frequency used by the base station 10, is in a different frequency band to that of the access points. Alternatively or additionally, it may be that the isolation from the wide area signal makes the wide area signal less significant than signals from other neighbouring access points.

Consider this scenario—an office building or university campus which has a network of access points. If an access point is inserted/switched on or removed/switched off, this can have an influence on the other access points of the local network. This may particularly have an effect on those access points which operate in the same or partially in the same frequency band(s).

In some embodiments of the present invention, parameters such as downlink transmit power, cell identity, spectrum usage, antenna pattern (beam configuration), timing and control channel configuration may be configured for an access point which is inserted/switched on taking into account the values of those parameters already in use by neighbouring access points and perhaps over a wider ranging network of such access points. Some embodiments of the present invention are arranged such that the access point is configured to determine one or more of these parameters without requiring the support from the core network thereby to provide a plug-and-play functionality. However, it should be appreciated that in some embodiments of the present invention, some assistance from the core network may be provided.

The access points are configured to measure the radio environment to detect information about the configuration of one or more neighbouring/surrounding access points. In relatively dense deployments of access points, and due to TDD (time division duplexing) synchronised operation of these nodes, it may happen that these measurements overlap in time which may lead to the wrong choice of self configured parameters since two access points 30 would stop transmission (and hence interfering) to perform measurements at the same time.

Consider the examples shown in FIG. 2. The two access points 30*a* and 30*b* are neighbouring and in this example, attempt at the same time to configure the frequency resources to be used. Both of these access points obtain similar measurement results and as a result end up with the same frequency configuration and consequently provide significant interference to one another.

In more detail, the access points 30*a* and 30*b* attempt to self configure the frequency resources to use. The metric used by both of these access points is the lowest level of received information. The first and second access points conduct measurements at the same time. Graph A shows interference against frequency blocks at the time when the first access point 30*a* carries out its measurements. Graph B shows the similar graph at the time when the second access point 30*b* carries out its measurements. As can be shown in Graph A, the interference level is at the lowest point during frequency blocks 6, 7 and 8. The second access point 30*b* determines that the interference level is lowest for frequency blocks 6 to 10. Based on the results of the measurements, the first access point 30*a* and second access point 30*b* configure how they use their respective frequency resources. The first access node 30*a* and the second access node 30*b* select frequency resource configurations which overlap and as can be shown from Graphs C and D, a high interference level is experienced by the access points. In particular, Graph C shows the interference against frequency blocks experienced by the first access point 30*a* whilst Graph D shows the similar plot for the second access point. The first access point 30*a* experiences relatively high interference in frequency blocks 6, 7 and 8, whilst the second access point experiences relatively high interference in the same frequency blocks 6, 7 and 8.

In some embodiments of the present invention, the measurement periods of uncoordinated or coordinated (in time) clusters of these access points are not overlapping or at least not overlapping to a sufficient extent to avoid the access points substantially stopping transmission for the measurements of the same time.

Figure 3:
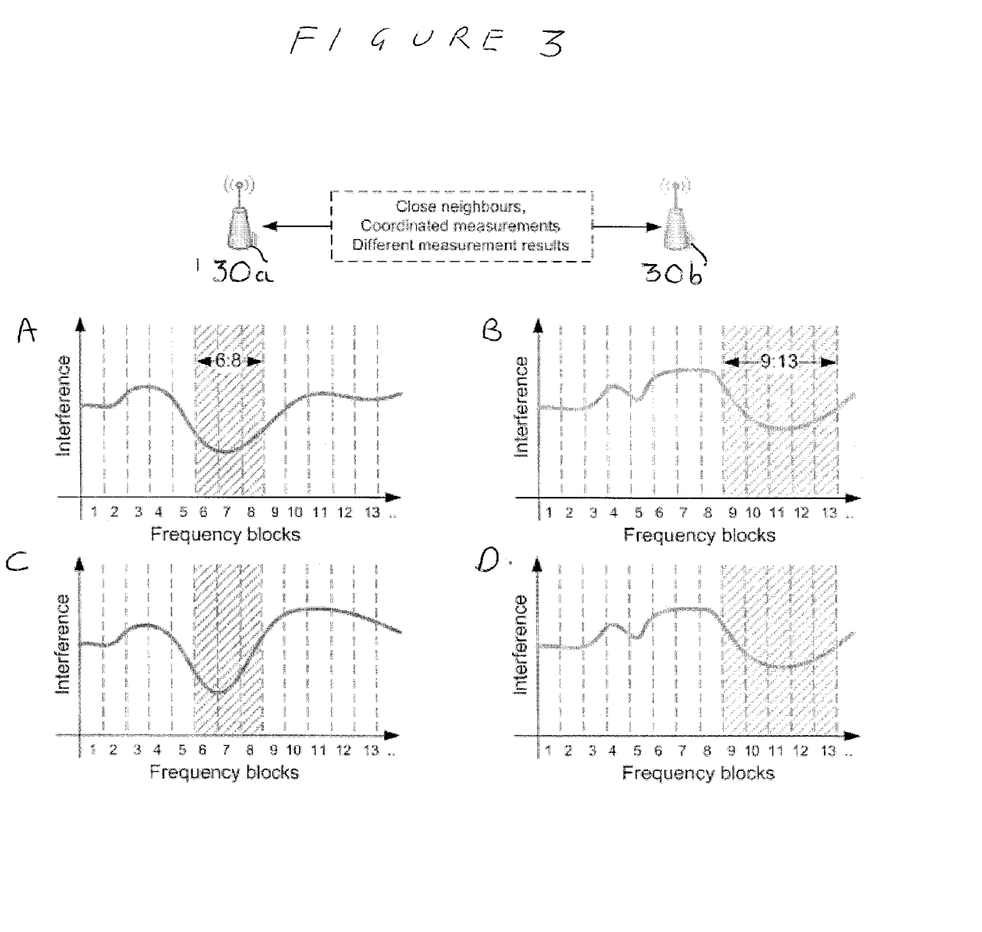
FIG. 3 schematically shows frequency resource configuration on the basis of coordinated measurement.

Reference is made to FIG. 3. In the following scenario, the two access points 30a and 30b are again close neighbours. The frequency resource configuration is determined on the basis of coordinated measurements. In particular, the first access point 30a and the second access point 30b attempt to self configure the frequency resources to be used. The metric for the decision making by these access points is the lowest level of received interference. It should be appreciated that this is by way of example only and alternative embodiments of the present invention may use a different metric or one or more additional metrics.

The first and second access nodes 30a and 30b are configured to use different time slots in order to make their measurements. Various options for ensuring that the first and second access points, 30a and 30b, use different time slots will be described in more detail hereinafter.

In the scenario shown in FIG. 3, the first node measures the interference and completes the frequency configuration procedure. The measurements made by the first access point 30a, are shown in Graph A. As can be seen from Graph A, the lowest interference is determined for frequency blocks 6, 7 and 8.

The second access point 30b then measures the interference and completes its frequency configuration procedure. Because the second access point 30b is making its measurement at a different time from the first access point, the interference from the first access point is taken into account. As can be seen from Graph B, the second access point 30b determines that the lowest interference is determined for frequency blocks 9 to 13.

The frequency resources used by the first and second access points 30a and 30b are thus selected and as can be seen from Graph C and D, the interference levels for frequency blocks 6 to 8 remain low for the first access point 30a whilst the frequency remains low for frequency blocks 9 to 13.

Figure 6:
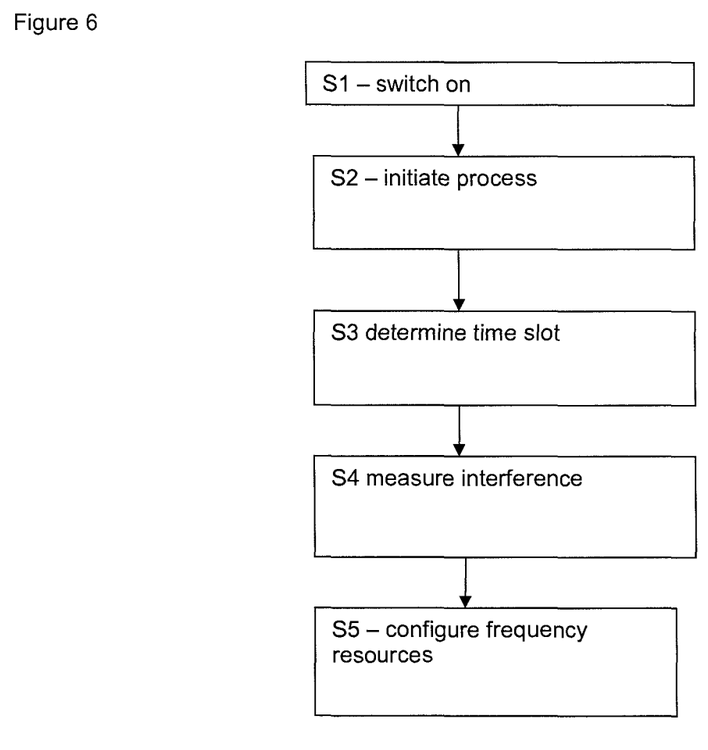
FIG. 6 shows a method embodying the invention.

Reference is made to FIG. 6 which shows a flow chart of a method embodying the present invention.

In step S1, an access point is switched on (or inserted into a network).

In step S2, the access point initiates the process to determine the frequency resources to be used.

In step S3, the time slots in which interference from neighbouring access points is to be measured, is determined. The options for determining the time slot will be described in more detail later.

In step S4, the access point measures the interference.

In step S5, the access point, based on the measured interference configures the resources. These resources may be any one or more of any relevant cell- and radio-operation specific resources and configurations, provided with certain designated rules, parameters and constraints. One example only is frequency.

If the access point network is operated in a coordinated manner with wide area control plane support available, then one of the following options may be selected:

The access points are synchronised to the overlying wider area network utilised for control plane signalling. This could be, for example, the available GSM network or 3GPP UMTS network. In other words, the network will control the time slots used by different access points so that the different time slots do not collide. Accordingly, in the context of step S3, the determination of the time slot would be determining the time slot information received from the network.

In a second option, the measurement slots/frames/intervals are fixed and are assigned to each of the access points on the basis of the identity of the access point and/or a system frame number (SFN) setting. The access point is provided with a unique identity and this may, for example, be a cell identity. The measurements which are performed by each of the access points are regular but the offset is different for each access point. The offset is derived from the unique identity or SFN setting. If the SFN setting is used, the SFN of the overlying wide area network can be used as a common reference point.

In the third option, the determining of the time slot would be as follows:

The measurement slots are random within certain time limits, with a fixed component such as a measurement interval or window of N system frames. The probability of measurement collision is controlled by an initial seed for an internal random number generator which the access point has. The initial seed used will be different for each access point. That initial seed may be signalled by the control plane, e.g. via access point to support node (SN) communication. The support node is a centralized or distributed data base or an interface to a centralized or decentralized data base where the information of the access point location and network operation and maintenance (OAM) parameters are stored.

In an alternative embodiment, the seed may be derived from a unique identity of the access point, for example from the cell identity. Collisions of the measurement slots, i.e. two neighbouring access points using the same measurement slot, are not excluded but the probability of such a collision is reduced, particularly if the measurement is repeated at least once.

If the network of access points is operated in a coordinated manner, with no wide area control plane support available, one of the following options may be used:

Deterministic or random measurement slot configurations based on the second and third options above can also be used in a fully distributed, self-configured fashion. Access points may measure or sense surrounding radio environment, detect all impacting neighbour cells cell identity, SFN setting and so on. Based on that information, an access point can derive proper cell configuration including measurement slot configurations. These slots' determinations may be either deterministic, i.e., which slot which access point is to use, or random. This can be used by an access point to set up and operate its cell.

It would be appreciated that one or more access points may act as a control access point for itself and its neighbouring access points to determine the coordination of the time slots either deterministically or randomly.

A second option, where no wide area control plane support is available, is to use UE based de-synchronisation of measurement patterns. A user equipment connected to a first access point may detect measurement gap timing differences to neighbouring cells and if an overlap is detected, the user equipment may send a de-synchronisation message to its own access point to ensure that measurement patterns of access points are de-synchronised with respect to each other. In this regard, the signals received by the transceiver 7 of the UE are analysed by the data processing entity 3. If the data processing entity determines that there is a gap in transmission of two access points which repeatedly occur during periodic measurements at the same time, then the data processing entity will make the determination that the two access nodes are making interference measurements substantially at the same time. The data processing information will formulate a message which is transmitted by the transceiver or via meshed cable connections to one or more of the access nodes in question to request a measurement pattern change or indicate a measurement pattern collision.

When considering measurements for initial self-configuration of an access point, it is useful that the access point detects all the impacting neighbours and derives appropriate cell configuration parameters. In the case where there is no wide access control plane support, this may also include a downlink cell scrambling sequence or synchronisation sequence (for example layer 1 (L1) cell ID=layer 1 cell identification) which should be unique among a particular cell cluster or neighbourhood. Accordingly, to avoid the situation where two neighbouring access points are reactivated into the same neighbourhood at the same time and select the same configuration, for example a particular L1 cell identity or if a just being reactivated access point selects the same configuration, for example an L1 cell identity as that of a nearby up and running access point, for example due to the fact that both access points were doing downlink measurements at the same time so the new access point does not detect the existing access point, the following may also be carried out in some embodiments of the invention.

The measurement for the initial cell configuration of an access point may be divided into the two phases. The first phase may be configured with a fixed measurement interval of multiple system frames, and may be semi-static, sufficient enough that the access point can sense the environment and determine a temporary L1 cell identity and necessary configurations to start transmitting downlink synchronisation channel alone. That is, the particular access point is not yet fully operational (able to serve users). The second phase may be configured based on the option discussed above in relation to the random measurement slots. During this second phase, the access point may measure whether the selected configuration, for example the L1 cell identity is already used by any other nearby access points. As soon as the access point detects a collision, it may derive and reselect a new L1 cell identity and restart the second phase. If no collision is detected during the second phase, the access point can take the selected configuration, i.e. L1 cell identity or the like to use for setting up that the cell. The whole process of phase 1 and 2 may be reset and/or restarted if there are N consecutive collisions detected or a given number of phase 2 repetitions.

Some embodiments of the present invention may be implemented in the LTE and LTE-A systems. For example, potential downlink measurement slots in which cell specific common control channels are sent including PSS and SSS (primary and secondary synchronization signals determining L1 cell identity) and PBCH (broadcast system information) are slot 0 and slot 5 synchronised across a certain service area. This provides a measurement interval of 200 milliseconds—20 system frames of 10 milliseconds, for example. For example, there are 40 potential measuring slots. For the measurement configuration of interest among neighbouring access points where there is potentially partial overlap but not full overlap, the measurement collision window is 400 milliseconds with 80 potential measurement slots. Depending on the maximum number of neighbouring access points provided, the appropriate scheme can be selected for the measurement coordination and control.

By way of example only, consider an access point neighbourhood or cluster of about 27 cells, potentially arranged in a three dimensional cube model, 80 potential slots over 400 milliseconds can be assigned to individual access points so that each access point has some exclusive slots. In the random slot arrangement, a simple option could be that an access point may decide to do measurement in a random pattern of slots driven from a given seed and/or cell identity and/or in any given slot within the measurement window with the probability of Pr which can be set semi-statically or dynamically depending on the number of neighbouring cells it has.

Embodiments of the present invention can be used with access nodes which may be operated out of operator tight control with relatively high node dynamics in terms of location, frequency resources and/or other parameters. Some embodiments of the present invention may be used in conjunction with the home (eNodeB).

Embodiments of the present invention may be used to set any suitable parameter. By way of example only, the set parameters may be radio parameters. The radio parameters may comprise one or more of time and frequency resource, transmit power, cell ID and/or any other suitable alternatives.

Figure 5:
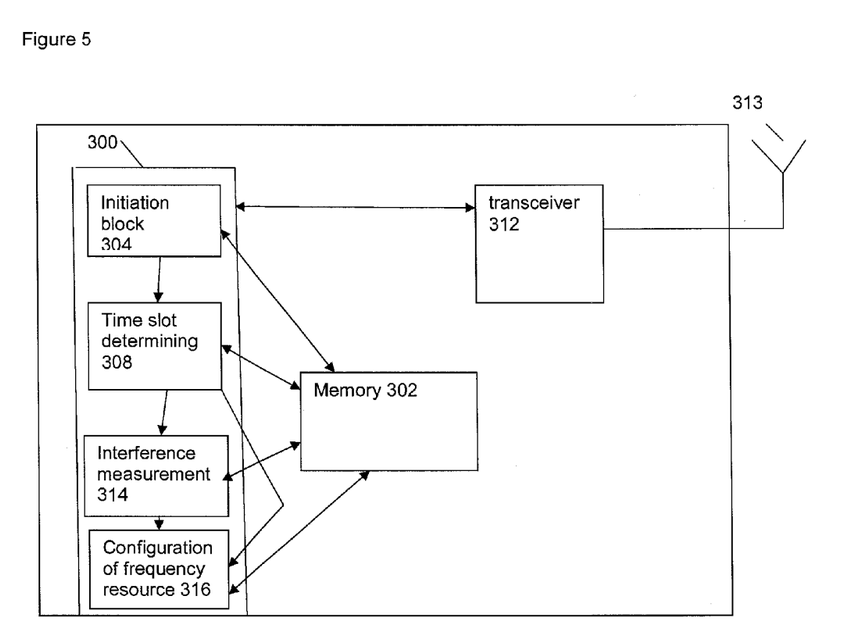
FIG. 5 schematically shows an access node embodying the invention.

Reference is now made to FIG. 5 which shows schematically an access node embodying the present invention.

The access node comprises an antenna 313. The antenna is connected to a transceiver 312. The transceiver 312 is arranged to receive signals from user equipment in an area covered by the access point. The transceiver is also arranged to receive signals from other access points. The transceiver is also arranged to transmit signals from the access node to the user equipment.

The access node also comprises a memory 302 and a processor 309. The processor 300 is connected to the memory 302. The processor can be considered to have the following functional blocks:

An initiation block 304 which when the access node is reactivated, switched on or inserted, initiates the frequency resource configuration process.

A time slot determining block 308 is also provided. The determining of the time slot block may use one or more of the following: information received from a wide area control network; use of a cell ID and/or system frame number; carrying out random number generation using an appropriate initial seed; or information received via the transceiver from user equipment. It should be appreciated that the time slot determining block may use information which is stored in the memory. This information may be, for example the cell ID, system frame number information; an initiation seed and/or information which the access point has previously received from another source.

The measuring interference block 314 will control the transceiver such that it stops transmitting on the appropriate time slot or time slots.

The configuration of the frequency resources block 316 uses the received information to determine the appropriate frequency configuration which is used to control subsequent operation of the access node.

It should be appreciated that the allocation of frequency resources procedure can be carried out at regular intervals.

A non-limiting example of mobile architectures where the herein described principles may be applied is known as the Evolved Universal Terrestrial Radio Access Network (E-UTRAN). The eNBs may provide E-UTRAN features such as user plane Radio Link Control/Medium Access Control/Physical layer protocol (RLC/MAC/PHY) and control plane Radio Resource Control (RRC) protocol terminations towards the user devices.

At least some of the processing of the processing block may be carried out by one or more processors in conjunction with one or more memories.

The processing block may be provided by an integrated circuit or a chip set.

The required data processing apparatus and functions of an access point or access node as well as an appropriate communication device may be provided by means of one or more data processors. The above described functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus associated with the access point or node and/or a data processing apparatus associated with a UE. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE, similar principles can be applied to any other wireless communication system to support uncoordinated local area deployments. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   determining at least one time interval for an access node of a group of neighboring access nodes, said at least one time interval being one in which said access node has substantially no transmission and said one or more other access nodes of said group are transmitting;
   performing, by said access node, radio measurements during said at least one determined time interval on said one or more transmitting access nodes of said group to detect configuration information of said one or more transmitting access nodes; and
   configuring radio resources for said access node based on said detected configuration information of said one or more transmitting access nodes.

2. The method as claimed in claim 1, wherein determining the at least one time interval comprises determining an offset for said access node to use.

3. The method as claimed in claim 1, wherein determining the at least one time interval uses information associated with said access node, said information associated with said access node comprises at least one of:
   an identity of said access node, a cell identity of said access node; and a system frame number setting.

4. The method as claim in claim 3, comprising using said information to determine an offset, said offset determining at least one of said time interval and a repetition pattern.

5. The method as claimed in claim 1, wherein determining the at least one time interval comprises selecting a time interval substantially at random using a random number generator.

6. The method as claimed in claim 5, wherein using said random number generator comprises using a seed for said random number generator based on at least one of: a unique identity of said access node; a received seed; a cell identity for said access node.

7. The method as claimed in claim 1, comprising receiving information from a user device indicative of said access node using at least one of a same time interval and repetition pattern as said one or more other access nodes for said measuring, determining a further time interval using said received information, and further performing radio measurement in said determined further time interval.

8. The method as claimed in claim 1, comprising determining if whether said radio resources are used by a neighboring access node by transmitting a synchronization channel or cell identity.

9. The method as claimed in claim 8, comprising, in response to determining that said configured radio resources are used by at least one other access node of the group, repeating the steps of performing radio measurements and configuring radio resources.

10. The method as claimed in claim 9, comprising, in response to determining N consecutive times that said configured radio resources are used by at one other access node in the group, resetting said method.

11. A method comprising:
    receiving transmissions in a user equipment from a plurality of neighboring access nodes, said user equipment being connected to one of said access nodes;
    detecting by said user equipment that a plurality of neighboring access nodes are detecting configuration information in a substantially overlapping time interval; and
    sending information a de-synchronization message about said detected substantially overlapping time interval to said one of said access nodes to ensure that detections of configuration information by said plurality of neighboring access nodes are de-synchronized with respect to one another.

12. An apparatus comprising:
    at least one memory storing a computer program and at least one processor;
    in which the at least one memory with the computer program is configured with the at least one processor to cause the apparatus to:
    determine at least one time interval for an access node of a group of neighboring access nodes, said at least one time interval being one in which said access node has substantially no transmission and said one or more other access nodes of said group are transmitting;
    cause radio measurements to be performed during said at least one determined time interval on said one or more transmitting access nodes of said group to detect configuration information of said one or more transmitting access nodes; and
    configure radio resources for said access node based on said detected configuration information of said one or more transmitting access nodes.

13. The apparatus as claimed in claim 12, wherein the at least one memory with the computer program is configured with the at least one processor to cause the apparatus to determine an offset for said access node to use.

14. The apparatus as claimed in claim 12, wherein the at least one memory with the computer program is configured with the at least one processor to cause the apparatus to determine the at least one time interval for the access node using information associated with said access node, the information comprising at least one of:
    an identity of said access node, a cell identity of said access node; and a system frame number setting.

15. The apparatus as claimed in claim 14, wherein the at least one memory with the computer program is configured with the at least one processor to cause the apparatus to use said information to determine an offset, said offset determining at least one of said time interval and a repetition pattern.

16. The apparatus as claimed in claim 12, wherein the at least one memory with the computer program is configured with the at least one processor to cause the apparatus to determine the at least one time interval for the access node using a random number generator.

17. The apparatus as claimed in claim 16, wherein said random number generator is configured to use a seed based on at least one of:
a unique identity of said access node; a received seed; a cell identity for said access node.

18. The apparatus as claimed in claim 12, wherein the at least one memory with the computer program is configured with the at least one processor to cause the apparatus to, on receiving information from a user device indicative of said access node using at least one of a same time interval and repetition pattern as said one or more other access nodes for said measuring, determine a further time interval using said received information, and to cause the radio measurements to be performed in said determined further time interval.

19. The apparatus as claimed in claim 12, wherein the at least one memory with the computer program is configured with the at least one processor to cause the apparatus to determine whether said configured radio resources comprise radio resources used by a neighboring access node.

20. An access node comprising apparatus as claimed in claim 12.

21. An apparatus comprising:
at least one memory storing a computer program and at least one processor;
in which the at least one memory with the computer program is configured with the at least one processor to cause the apparatus to:
analyze transmissions from a plurality of neighboring access nodes to detect that a plurality of neighboring access nodes are detecting configuration information in a substantially overlapping time interval; and
cause a de-synchronization message to be sent about said detected substantially overlapping time interval to at least one of said plurality of neighboring access nodes to ensure that detections of configuration information by said plurality of neighboring access nodes are de-synchronized with respect to one another.

22. A computer program code product comprising a non-transitory computer-readable storage medium bearing computer program code embodied therein for use with a computer, the computer program code comprising code for performing the method according to claim 1.

23. A computer program code product comprising a non-transitory computer-readable storage medium bearing computer program code embodied therein for use with a computer, the computer program code comprising code for performing the method according to claim 11.

* * * * *

UNITED STATES PATENT AND TRADEMARK OFFICE
CERTIFICATE OF CORRECTION

PATENT NO.       : 8,903,384 B2  
APPLICATION NO.  : 13/500090  
DATED            : December 2, 2014  
INVENTOR(S)      : Szufarska et al.

It is certified that error appears in the above-identified patent and that said Letters Patent is hereby corrected as shown below:

In the Claims:

Claim 8, col. 12, line 5 "if" should be deleted before "whether".

Claim 11, col. 12, line 24 "information" should be deleted in between "sending" and "a".

Signed and Sealed this  
Thirty-first Day of March, 2015

Michelle K. Lee  
*Director of the United States Patent and Trademark Office*